(12) United States Patent
Chen et al.

(10) Patent No.: US 7,706,488 B2
(45) Date of Patent: Apr. 27, 2010

(54) OFDM FRAME SYNCHRONISATION ALGORITHM

(75) Inventors: Nongji Chen, Surrey (GB); Robert Heaton, Aldershot (GB); Miyuki Tanaka, London (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1093 days.

(21) Appl. No.: 10/824,395

(22) Filed: Apr. 15, 2004

(65) Prior Publication Data

US 2004/0208269 A1    Oct. 21, 2004

(30) Foreign Application Priority Data

Apr. 17, 2003  (EP) .................................. 03252484

(51) Int. Cl.
H04L 7/00    (2006.01)
(52) U.S. Cl. ...................... 375/354; 375/260; 333/132; 348/532; 348/536; 370/520
(58) Field of Classification Search ................ 370/203, 370/206, 207, 208, 210, 312, 350, 520; 375/316, 375/344, 355, 367, 260; 708/422; 455/41.2
See application file for complete search history.

(56) References Cited

U.S. PATENT DOCUMENTS 6,505,032 B1 *  1/2003  McCorkle et al. ........... 455/41.2
6,539,063 B1 *  3/2003  Peyla et al. .................. 375/267

FOREIGN PATENT DOCUMENTS

| EP | 0 896 457 A1 | 2/1999 |
|----|--------------|--------|
| EP | 1 079 579 A1 | 2/2001 |
| GB | 2 373 692 A  | 9/2002 |

* cited by examiner

*Primary Examiner*—David C Payne
*Assistant Examiner*—Adolf Dsouza
(74) *Attorney, Agent, or Firm*—Birch, Stewart, Kolasch & Birch, LLP

(57) ABSTRACT

A synchronization pulse representing a symbol boundary in a signal such as an OFDM signal is obtained by deriving a first signal representing the difference between the amplitudes of samples separated by the useful part of an OFDM symbol, a second signal representing the phase difference between the samples, and combining the first and second signals to derive a resultant signal. The resultant signal is examined and the synchronization pulse generated in response to the signal changing in a predetermined manner.

11 Claims, 4 Drawing Sheets

Figure 1:
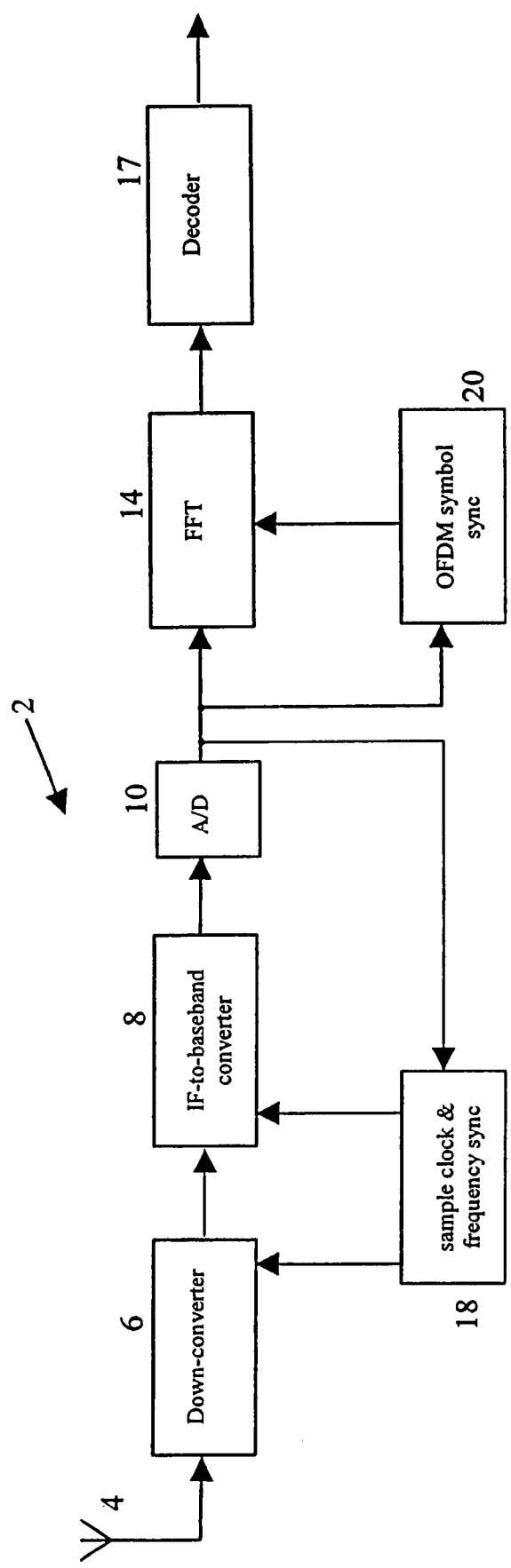

ND FRAME SYNCHRONISATION
OFDM FRAME SYNCHRONISATION ALGORITHM

This Nonprovisional application claims priority under 35 U.S.C. § 119(a) on Patent Application No(s). 03252484.5 filed in EUROPE on Apr. 17, 2003, the entire contents of which are hereby incorporated by reference.

This invention relates to synchronisation of signals of the type which comprise frames in which there is a guard interval and a useful symbol period, with part of the useful symbol period containing data corresponding to that in the guard interval. It is particularly but not exclusively concerned with the generation of a synchronisation pulse representing a symbol boundary of an orthogonal frequency division multiplex (OFDM) modulated signal, for example for use in Fourier Transform demodulation.

OFDM systems are well known. Various techniques have been used for synchronisation of OFDM receivers. Some of these techniques require transmission of a special synchronisation signal. Other techniques rely on a standard OFDM signal, in which a complete symbol comprises a "useful part" and a "guard space", the guard space sometimes being referred to as a guard interval, cyclic extension or cyclic prefix.

The guard space precedes the useful part of the symbol and contains a repeat of the data at the end of the useful part. (This is equivalent to having a guard space after the useful part, containing data which is the same as that at the beginning of the useful part.)

Synchronisation techniques which rely upon the duplicated data in the guard space generally operate by performing a cross correlation between complex samples spaced apart by the length of the useful part of the symbol. This generates a timing pulse which is used in Fourier Transformation of the received signal. The timing of the pulse is such that the Fourier Transform window contains only data from a single symbol.

If the timing is incorrect, inter-symbol-interference (ISI) occurs. However, the use of the guard space allows a certain amount of variation in the timing of the pulse while still avoiding ISI. The guard space should be longer than the longest expected spread of delays amongst signals received via different paths. The guard space is relatively small compared with the useful part of the signal; typically, the guard space may contain N/32, N/16, N/8 or N/4 samples, where N is the number of samples in the useful part of the symbol.

Various techniques exist for deriving the synchronisation pulse from the cross-correlation function. Although these operate adequately in common reception conditions, there are circumstances in which the timing pulse is generated at an undesirable point, leading to ISI.

The cross-correlator, in the absence of noise or multi-path interference, produces an output which averages to zero except during the time that the guard space samples are cross correlated with the samples, in the useful part of the symbol, which are of equal value. During that period, the cross-corrrelator produces a high-level output. This high-level output terminates at the end of one symbol and the beginning of the next. One prior art arrangement integrates the output of the correlator, and then peak-detects the resultant signal to produce a timing pulse at the end of each symbol. In the case of multi-path interference, wherein the same signal is received via different delays, in order to avoid ISI, the synchronisation pulse should be generated during a window which has a width equal to the overlap between the guard spaces of the various received versions of the signal. However, the cross-correlator will produce a significant output throughout the period in which samples of any of the guard space samples of the different received signal versions are being processed by the cross-correlator. In some circumstances, this will result in the timing pulse being provided outside the optimum window, thus resulting in ISI.

GB-A-2373692 (incorporated herein by reference) discloses an arrangement intended to mitigate this problem, by applying the correlator output to an integrator having a short sliding-mean window, and thereby closely tracking variations in the output. In this way, the period in which the correlation output is significant (because the correlator is processing guard space samples from a received signal version) is effectively split into sub-intervals, and the synchronisation pulse can be provided in an appropriate sub-interval. It is also possible to use, instead of a cross-correlator, an arrangement which determines the difference between the absolute values of samples separated by the length of the useful part of the symbol, as described in EP-A-1079579 (incorporated herein by reference). This avoids inaccuracies due to variations in phase rotations caused by local oscillator drift.

It would be desirable to provide an improved technique for generating an OFDM symbol synchronisation pulse.

Aspects of the present invention are set out in the accompanying claims.

According to a further aspect of the invention, a synchronisation pulse is derived by examining pairs of samples of a received signal which are separated by a period corresponding to the useful part of the symbol, so as to provide a first signal depending upon the relationship between the amplitudes of the samples of each pair and a second signal dependent upon the relationship between the phases of the samples of each pair. These two signals are combined and the resultant signal examined, the synchronisation pulse being generated in response to the resultant signal changing in a predetermined manner.

When the pairs of samples are derived from a guard interval and a corresponding sample in the useful part of the signals, the samples should have corresponding amplitude and phase values. In practice, due to noise, multi-path interference, offsets in local oscillator frequencies, etc., the amplitudes and the phase values may not be equal. Nevertheless, the difference between the amplitudes and the difference between the phases will both be relatively low.

On the other hand, when the samples are derived from other parts of the symbol, there will be no fixed relationship between the amplitude values and phase values of the respective samples in each pair. Accordingly, the amplitude difference and the phase difference will both vary significantly and on average both be relatively high.

By separately taking into account both the amplitude and phase differences (rather than discarding phase information as in many prior art arrangements), it is possible to provide a clearer distinction between the period in which guard period samples are being processed and the period in which guard period samples are not being processed. Furthermore, in the case of multi-path interference, it is possible more easily to distinguish between different sub-intervals of the period during which the guard period samples are being processed, when there are different levels of ISI noise, as the guard period samples are derived from different versions of the signal.

In a preferred embodiment of the invention, in the case of multi-path interference, the resultant signal exhibits level changes whenever an individual guard period (corresponding to a respective one of the received signal versions) starts, or ceases, to be processed. The synchronisation pulse is generated in response to detecting the first level change to indicate that a guard period has ceased to be processed.

Preferably, at least one and more preferably both of the amplitude-difference and phase-difference signals are low-pass filtered together with the corresponding values for adjacent samples in order to reduce the effect of noise. This could be achieved by taking the sliding mean of successive values. Preferably, the phase-difference signal is filtered to track relatively high phase difference values so as to enhance the difference between the values appearing while samples of different guard periods are being processed.

Preferably, signal values for corresponding parts of successive symbols are filtered to reduce the effects of noise.

Figure 2:
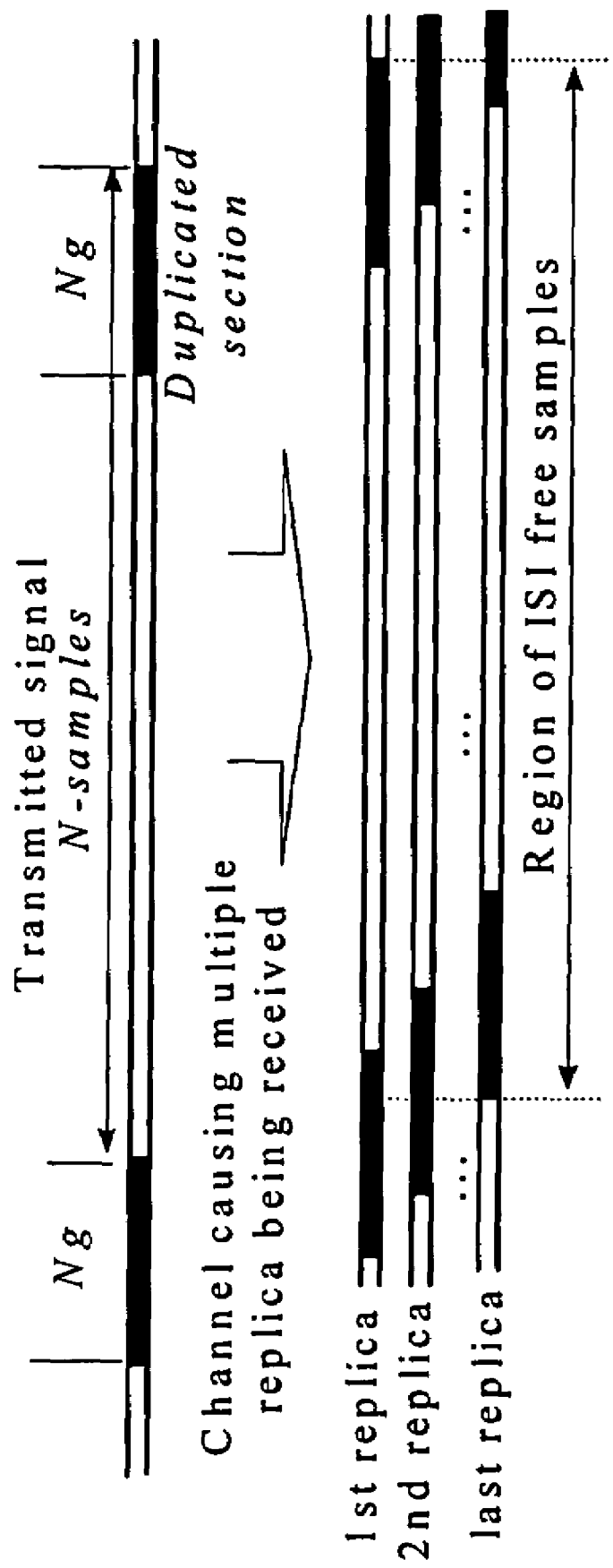
Figure 3:
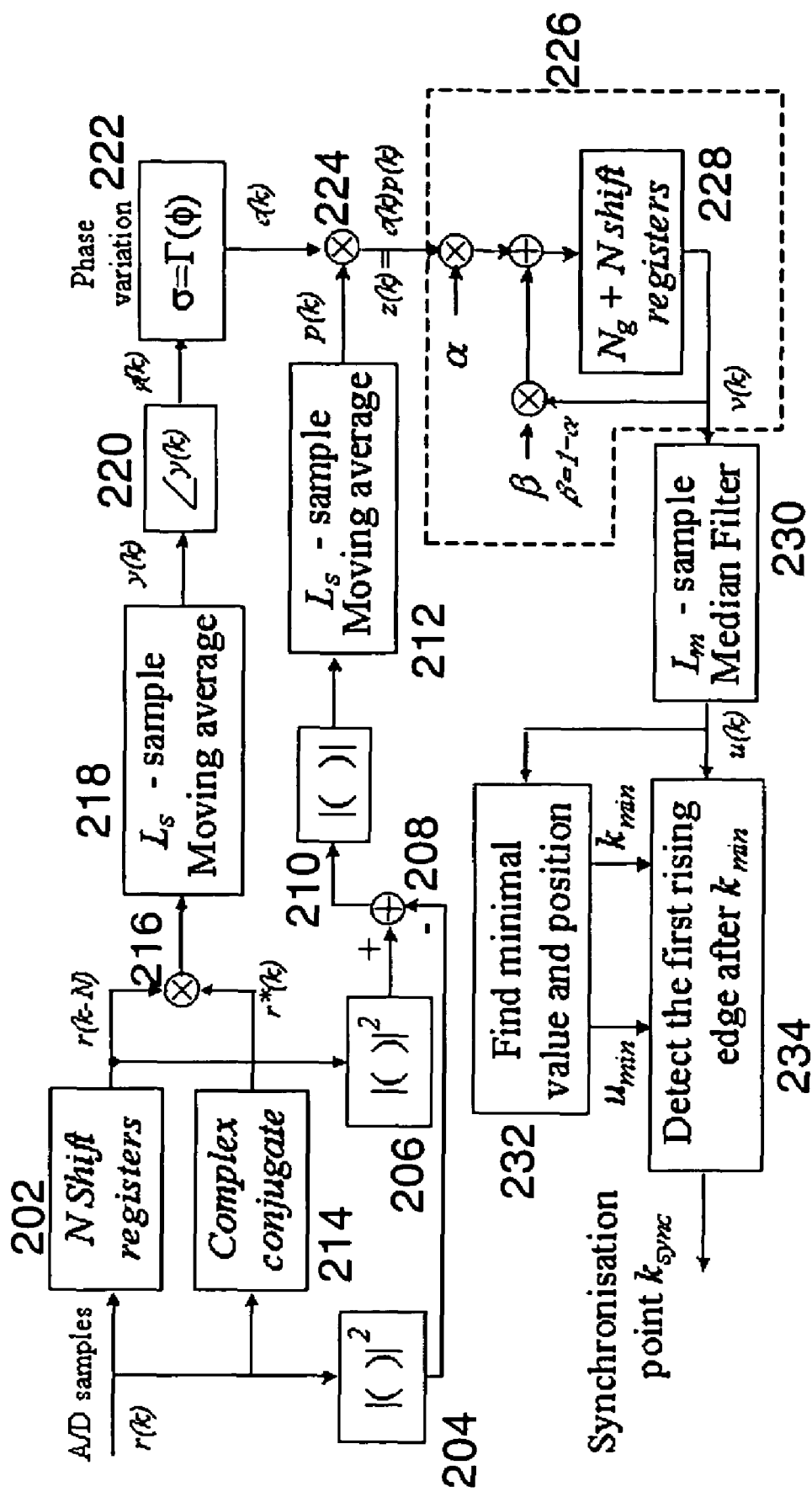
Figure 4:
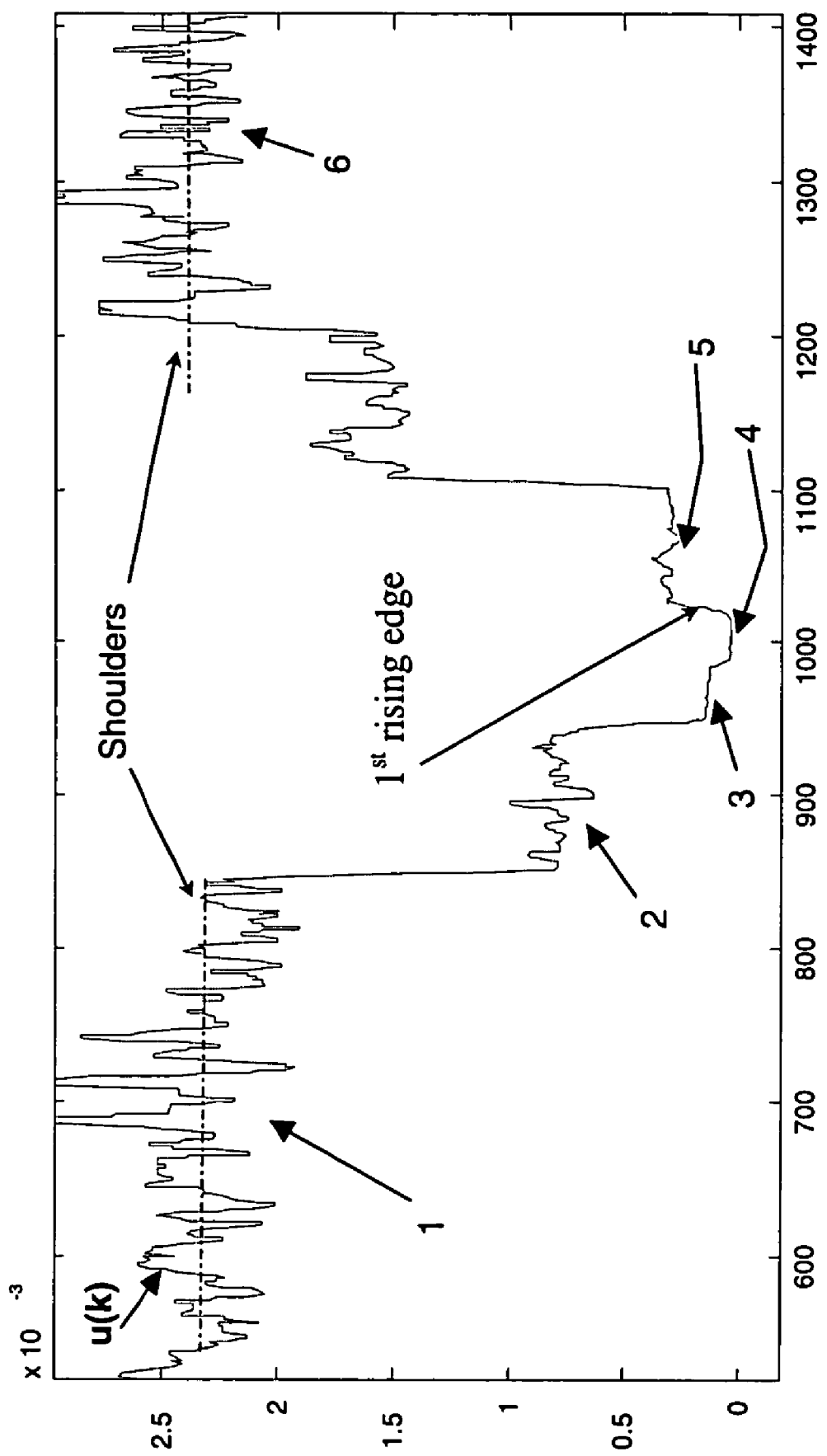

An arrangement embodying the invention will now be described by way of example with reference to the accompanying drawings, in which:

FIG. 1 is a block diagram of an OFDM receiver in accordance with the present invention;

FIG. 2 schematically represents the effects of multi-path interference on an OFDM signal;

FIG. 3 is a block diagram of a synchronisation circuit of the receiver of FIG. 1; and FIG. 4 shows an example of an output of a median filter of the circuit of FIG. 3.

Referring to FIG. 1, an OFDM receiver 2 comprises an antenna 4 which receives a signal and presents it to a down-converter 6 which converts the RF signal to an IF signal. This is then converted into a baseband signal by an IF-to-baseband converter 8. This produces at its output complex samples of each transmitted OFDM symbol. These complex samples are digitised by an analog-to-digital (A/D) converter 10, and delivered to a Fast Fourier Transform (FFT) circuit 14. The FFT circuit 14 converts the samples from the time domain to the frequency domain, and the symbol data at the output is provided to a decoder 17. If desired, the complex samples from the A/D converter 10 may also be delivered to a sample clock and frequency synchronisation circuit 18, which is used to control the local oscillator frequencies used by the down converter 6 and the IF-to-baseband converter 8; however, it is also possible to implement the receiver without requiring such feedback.

The complex samples are also delivered to a symbol synchronisation circuit 20, which generates a synchronisation pulse for use by the Fast Fourier Transform (FFT) circuit 14. The FFT circuit 14 requires the synchronisation pulse so that each transformation operation is aligned with the start of an OFDM symbol.

The circuit described so far is known from the prior art, and could be modified in a number of ways which are known per se. The present invention is directed to a novel and inventive technique for use in the symbol synchronisation circuit 20.

FIG. 2 schematically shows a transmitted signal, the signal comprising frames each of which comprises a guard interval of $N_g$ samples followed by N samples forming the useful part of the symbol. The useful part comprises $(N-N_g)$ samples followed by $N_g$ samples which are identical to those in the guard interval.

With a slow fading multi-path channel, the receiver will see a number of replicas of the transmitted signal, as indicated in FIG. 2. Each of the signal replicas is independently subject to scaling by the corresponding channel path's complex attenuation and delay in accordance to the channel delay profile. The received signal is the linear superposition of all these replicas, yielding blurred frame boundaries.

Examining the alignment of these multiple replicas, it is clear that the ISI free region for the received signal of an OFDM symbol lies between the start point of the last replica and the end point of the first replica. Assuming the channel delay spread is less than the length of the guard interval, this region will potentially have more than one choice for defining an N-sample block for FFT processing. Although any one among these blocks will be valid in terms of avoiding ISI noise, it is preferred to synchronise the FFT window to the sample block that starts from the position at the end of the guard interval of the first replica so that the guard interval can be fully exploited. This also leads to the minimal phase variation rate at the frequency domain output, which could potentially result in less demanding post-FFT equalisation efforts. From this perspective, one can equivalently regard the optimal timing synchronisation problem as an issue of estimating the time position of the first path in relation to the reference clock within the receiver.

The symbol synchronisation block 20 of Figure is shown in detail in FIG. 3. With reference to FIG. 3, the block 20 receives and processes digitised complex baseband samples r(k) from the A/D converter 10 of the OFDM receiver front end shown in FIG. 1.

The complex baseband input samples r(k) are delayed by N sample periods by a delay circuit 202, resulting in delayed samples r(k−N), so that the structural redundancy in the OFDM (i.e. the fact that the segment that forms the guard interval is a copy of a segment of the useful part) symbol sequence can be readily exploited. The received signal samples and their delayed version are then processed by two different signal processing chains to produce a magnitude characterisation output signal p(k) and a phase variation characterisation output signal σ(k) on a per-sample basis, as will be described.

The non-delayed samples r(k) and the delayed samples r(k−N) are delivered to respective squaring circuits 204, 206, the outputs of which are sent to a summer 208 to subtract one from the other. The modulus of the difference is derived from a modulus circuit 210, the output of which is sent to a sliding mean calculator 212. The magnitude output p(k) is thus the sliding mean of the squared differences of the received samples and those delayed by a number of samples N, where N corresponds to the length of the useful part of an OFDM symbol in samples. The sliding mean is calculated over a window size Ls, (Ls=5, for example) which is substantially smaller than the guard interval length of the OFDM symbol.

The non-delayed samples r(k) are delivered to a complex conjugator 214 and then multiplied by multiples 216 with the delayed samples r(k−N). Thus, the delayed and non-delayed samples are cross-correlated to implicitly evaluate the phase difference between pairs of samples. The result is then accumulated by a sliding mean calculator 218, which in this embodiment also has a window size of Ls. The complex output y(k) is delivered to a phase angle calculator 220 to extract the phase angle φ(k). This phase signal is further processed to yield an output σ(k), as discussed below, related to the variation in phase of adjacent output values φ(k).

A phase variation characteristic calculator 222 applies a function Γ(φ) to the phase angles φ(k) to calculate a value that is indicative of the phase variation in a local window of $L_s$ samples. Γ(φ) is an operation that calculates the phase differences among a group of samples and takes the second largest difference value as its output, i.e.

$$\sigma_k = \Gamma_k(\phi) = \max\{\text{trimmed\_max}\{|\phi_k - \phi_{k+j}|\}\}; j = L_s/2, \ldots, L_s/2. \tag{1}$$

Here, the expression $|\phi_k - \phi_j|$ in (1) denotes taking the shortest distance operation (i.e. eliminating any extra $2\pi$ values to yield an absolute value smaller than $\pi$) between the two angle values, and trimmed_max{ } represents the removal (pruning) of the largest value element in the input set. The largest value element is ignored to reduce the likelihood of errors resulting from a noise anomaly, i.e. to mitigate the effects of occasional outliers. However, this is not essential; the function Γ(φ) could instead calculate the largest phase variation value.

When not processing samples derived from a guard space, the phase differences will fluctuate significantly between high and low values. By tracking the higher values, i.e., effectively ignoring any rare, transient low values, the function $\Gamma(\phi)$ will generate an output which is even more distinctive, as compared to the output when processing samples derived from a guard space. Furthermore, the output values within the period when guard space samples are being processed will tend to exhibit different characteristics depending on the degree of ISI noise, as will be shown below, by giving a quantitive representation of the phase alignment for a given local region centered at position k.

However, it should be noted that other functions may be used. For example, $\Gamma(\phi)$ could calculate the average phase difference value.

It should also be noted that, because of the way the phase angles are used, the calculation of $\phi(k)$ needs not be very accurate. This would have an implementation advantage since a moderate sized look-up table can be used instead of a phase calculation device for obtaining the phase angle values.

The amplitude related signal p(k) and the phase variation related signal $\sigma(k)$ are combined by a multiplier 224 to produce z(k). It is worth noting that the signal z(k) is real valued and contains information related to the original complex valued baseband samples paired as r(k) and r(k–N). Because the signal z(k) is real, rather than complex, subsequent circuit components are simplified.

An IIR (infinite impulse response) filter block 226 (with coefficients $\alpha$ and $\beta$) are applied to the signal z(k) for producing a filtered output $v(k)=\beta*v(k-N_g-N)+\alpha*z(k)$, where, $\alpha=1-\beta$ and $N_g$ is the guard interval length in samples. Due to the delay length of $N_g+N$ samples achieved by a delay circuit 228 of the filter 226, which is the length of the whole sample sequence of an OFDM symbol, the IIR filtering is done on a per-sample per-symbol basis.

Afterwards, the signal v(k) is in turn further processed in a median filter 230 of length Lm (Lm=5, for example) to produce an output u(k). Compared to traditional low pass filters, a median filter has the desired feature, in addition to removing noise, of maintaining sharp edges in the input signal. Again, the filter window size Lm should be small and of a value comparable to Ls if not equal. The median filter operation can be described as $$u_k = \text{mid}\{v_{k+j}\}; j=-L_m/2, \ldots, L_m/2. \qquad (2)$$

The median filter simply replaces a block of samples by the median or middle value in the block.

The median filter may be implemented in the following manner. A block of memory stores the last Lm samples received. Each new sample is added to this memory at the expense of the oldest sample, which falls out of the window or block. The entire population then needs to be sorted which could be achieved using a 'bubble sort'. Preferably the memory stores not just the value of the sample but also a value representing its age. When a new sample is received, the oldest currently stored sample is removed. The space released is used to allow the remaining samples to be shifted up or down one place in a manner that allows the new sample to be inserted into its correct place in the numerical order. In this way the population of samples is stored in numerical order at all times. The median is then simply the value in the middle of the list. Other sorting methods may be used to improve efficiency, of course.

FIG. 4 shows an example of an output of the median filter 230, during an interval in which the system is processing the guard period symbols of multiple received signals which have been subject to different delays, that is, when the duplicated samples at the end of the symbols are being received and processed with the delayed guard period samples. The vertical axis represents the amplitude of the median filter output in arbitrary units, and the horizontal axis represents the sample number.

It will be noted that initially the waveform adopts a relatively high level which varies (due to the arbitrary nature of the data content, noise, etc.) about an average level shown in broken lines. However, as soon as the duplicated samples in the first of the received signal versions are processed, the signal level drops substantially so that it varies around a lower level as indicated at 2. When the duplicated symbols for the next received signal version appear, the level drops still further as indicated at 3. Similarly, when the duplicated symbols of a third signal version appear, the level drops to that shown at 4.

It will be noted that the level fluctuates significantly during the period 2, but less in the periods 3 and 4. This is because there is a gradually decreasing degree of ISI noise at the successive levels, and, due to the function $\Gamma(\phi)$, an increased noise will tend to cause larger swings in the output values. This difference in signal characteristics is in addition to the differences in average signal level.

After the duplicated samples in the first signal version come to an end, the signal level rises to the level shown at 5. Similarly, other signal level rises occur after the end of the train of duplicated symbols in the other received signal versions, until the signal reaches stage 6, when the level again adopts the average shown by the broken line.

In the region of interest, therefore, the waveform exhibits shoulders, as indicated in the diagram, at respective sides of a multi-level trough. The first rising edge of the trough indicated in FIG. 4 corresponds (as discussed above) to the optimum point for the synchronisation signal to occur.

Accordingly, viewed from a frame perspective, the signal u(k) has a desirable feature of having its deepest notch in a region that indicates the position of those samples of r(k) in the guard interval that are least affected by ISI. A minimum value detector 232 (FIG. 3) exploits this feature by determining the minimum value $u_{min}$ and the index value of the minimal point $k_{min}$ of the signal u(k). These are then used to set the value of an adaptive threshold and the search starting point respectively to find the next rising edge of the signal u(k). The adaptive threshold $\delta_1(u_{min})$ is calculated in accordance with a linear formula:

$$\delta_1(u_{min})=\lambda*u_{min}+\eta \qquad (3)$$

where $\lambda$ is a constant gain with a value around 1.25 and $\eta$ is a fixed offset, which is preferably about 5% of the mean value in the shoulder regions (FIG. 4). These parameters are envisaged to be determined as part of the system design, although they also could be adjusted on-line in an adaptive approach.

An edge detector 234 comprises a level crossing detector and a differentiator implemented as an FIR (finite impulse response) filter. The synchronization point is determined by a search operation starting from the minimal value position $k_{min}$ in the index ascending direction. More specifically, the synchronization point $k_{sync}$ is the minimum value of k for which:

(a) the adaptive threshold is exceeded, i.e. $u_k > \delta_1(u_{min})$, and (b) the values throughout a period immediately following the position k are generally larger, by at least a certain amount, than those in the period immediately preceding the position k, i.e.:

$$\sum_{j=1}^{2L_s} u_{k+j} - \sum_{j=1}^{2L_s} u_{k-j} > \delta_2, k=k_{min}+1, \ldots$$

where $\delta_1(u_{min})$ is the adaptive threshold obtained via equation (3) and $\delta_2$ is a fixed threshold value. This $k_{sync}$ index value points to the start position of a N-sample data block that is least contaminated by ISI and it can now be used as the sync pulse denoting the start of the OFDM symbol FFT window.

It will be noted that condition (b) means that the synchronisation point will be located only after the signal u(k) has become relatively stable, rather than during the periods of high ISI noise. It is desirable for this condition to involve examining periods before and after the point k which are relatively long compared with $L_s$, but still substantially shorter than the guard interval.

The nature and positions of the various filters 212, 218, 222, 226, 230 can be varied in a number of ways to achieve similar effects. Those filters 212, 218, 222 and 230 which act in the direction of the samples are effectively low pass filters, but it should be ensured that they all have an effective time constant which is substantially shorter than the guard period so that the output of the median filter 230, from which the synchronisation pulse is derived, is allowed to fluctuate significantly over a number of cycles during the time that guard period samples are being processed. Thus, the filtering and processing parameters of the apparatus are determined in such a manner that the features extracted by the processing are well defined with respect to the guard interval.

The invention has been described in the context of an OFDM receiver, in which the synchronisation pulse is used to define the window of samples on which a Fast Fourier Transformation is performed. However, the invention is also useful in other circumstances in which there is a need for a synchronisation pulse representing the symbol boundaries; for example, such a pulse would be valuable in a repeater where full FFT demodulation is not performed.

Although the invention has been described in the context of multi-carrier signals, particularly OFDM signals, it is also applicable to single carrier signals, such as SC-FDE (single carrier frequency domain equalised) signals.

The functional elements described herein can be implemented either in dedicated hardware or in software.

The invention claimed is:

1. A method of generating a synchronisation pulse representing a symbol boundary in a signal comprising useful symbol periods separated by guard spaces, with data in each guard space corresponding to part of the data in a respective useful period, the method comprising processing by one or more processors pairs of samples of a received signal which are separated by a period corresponding to the useful part of the symbol by deriving a first signal dependent upon the relationship between the amplitudes of the samples of each pair, a second signal dependent upon the relationship between the phases of the samples of each pair, combining the first and second signals and generating the synchronisation pulse in response to the resultant signal changing in a predetermined manner, including the step of applying a filter to the resultant signal so as to combine values of the resultant signal with values for corresponding parts of different symbols, and deriving the synchronisation pulse from the filtered resultant signal.

2. A method of generating a synchronisation pulse representing a symbol boundary in a signal comprising useful symbol periods separated by guard spaces, with data in each guard space corresponding to part of the data in a respective useful period, the method comprising processing by one or more processors pairs of samples of a received signal which are separated by a period corresponding to the useful part of the symbol by deriving a first signal dependent upon the relationship between the amplitudes of the samples of each pair, a second signal dependent upon the relationship between the phases of the samples of each pair, combining the first and second signals and generating the synchronisation pulse in response to the resultant signal changing in a predetermined manner, including subjecting the resultant signal to a median filter prior to deriving the synchronisation pulse.

3. A method as claimed in claim 1 or claim 2, wherein the synchronisation pulse is generated in response to detecting a change in the resulting signal corresponding to termination of processing of the guard space data of the first of multiple versions of the signal subject to respective different delays.

4. A method as claimed in claim 1 or claim 2, including the step of low-pass filtering the first signal so as to reduce variations in the value of the first signal for successive sample pairs.

5. A method as claimed in claim 1 or claim 2, including the step of low-pass filtering the second signal so as to reduce variations in the value of the second signal for successive sample pairs.

6. A method as claimed in claim 1 or claim 2, including the step of filtering the second signal by tracking values corresponding to relatively high levels of phase difference.

7. A method as claimed in claim 1 or claim 2, wherein the first, second and resultant signals are derived in such a way that the resultant signal can fluctuate at intervals which are substantially shorter than the guard space.

8. A method as claimed in claim 1 or claim 2, when used for generating a synchronisation pulse representing a symbol boundary in an OFDM signal.

9. Apparatus for generating a synchronisation pulse representing a symbol boundary in a signal comprising useful symbol periods separated by guard spaces, with data in each guard space corresponding to part of the data in a respective useful period, the apparatus comprising:

a processor which processes pairs of samples of a received signal which are separated by a period corresponding to the useful part of the symbol, the processor having first processing means for deriving a first signal dependent upon the relationship between the amplitudes of the samples of each pair, a second processing means for deriving a second signal dependent upon the relationship between the phases of the samples of each pair, and a combiner for combining the first and second signals to form a resultant signal, a filter for filtering the resultant signal so as to combine values of the resultant signal with values for corresponding parts of different symbols, and generating means for generating the synchronization pulse in response to the filtered resultant signal changing in a predetermined manner.

10. A receiver comprising means for receiving and demodulating a signal, and apparatus for generating a synchronization pulse representing a symbol boundary in a signal comprising useful symbol periods separated by guard spaces, with data in each guard space corresponding to part of the data in a respective useful period, the apparatus comprising:

a processor which processes pairs of samples of a received signal which are separated by a period corresponding to the useful part of the symbol, the processor having first processing means for deriving a first signal dependent upon the relationship between the amplitudes of the samples of each pair, a second processing means for deriving a second signal dependent upon the relationship between the phases of the samples of each pair, and a combiner for combining the first and second signals to form a resultant signal, a filter for filtering the resultant signal so as to combine values of the resultant signal with values for corresponding parts of different symbols, and for generating means for generating the synchronization pulse in response to the filtered resultant signal changing in a predetermined manner.

11. Apparatus for generating a synchronisation pulse representing a symbol boundary in a signal comprising useful symbol periods separated by guard spaces, with data in each guard space corresponding to part of the data in a respective useful period, the apparatus comprising:

a processor which processes pairs of samples of a received signal which are separated by a period corresponding to the useful part of the symbol, the processor having first processing means for deriving a first signal dependent upon the relationship between the amplitudes of the sample of each pair, a second processing means for deriving a second signal dependent upon the relationship between the phases of the samples of each pair, and a combiner for combining the first and second signals to form a resultant signal, a median filter for filtering the resultant signal, and generating means for generating the synchronization pulse in response to the filtered resultant signal changing in a predetermined manner.

* * * * *